United States Patent
Rozman et al.

(10) Patent No.: US 8,952,570 B2
(45) Date of Patent: Feb. 10, 2015

(54) ACTIVE DAMPING WITH A SWITCHED CAPACITOR

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 707 days.

(21) Appl. No.: 13/218,166

(22) Filed: Aug. 25, 2011

(65) Prior Publication Data
US 2013/0049885 A1 Feb. 28, 2013

(51) Int. Cl.
*G05F 1/10* (2006.01)
*H02J 1/02* (2006.01)
*H02M 1/15* (2006.01)

(52) U.S. Cl.
CPC ... *H02J 1/02* (2013.01); *H02M 1/15* (2013.01)
USPC .......................................................... 307/98

(58) Field of Classification Search
USPC .......................................................... 307/98
See application file for complete search history.

(56) References Cited

U.S. PATENT DOCUMENTS

| | | | |
|---|---|---|---|
| 4,093,900 A | 6/1978 | Plunkett | |
| 4,119,861 A | 10/1978 | Gocho | |
| 4,420,784 A | 12/1983 | Chen et al. | |
| 4,638,175 A | 1/1987 | Bradford et al. | |
| 5,132,894 A | 7/1992 | Rozman et al. | |
| 5,291,143 A | 3/1994 | Cronauer | |
| 5,350,997 A | 9/1994 | Ghotbi et al. | |
| 5,422,517 A | 6/1995 | Verney et al. | |
| 5,455,731 A | 10/1995 | Parkinson | |
| 5,466,998 A | 11/1995 | Kinoshita et al. | |
| 5,495,155 A | 2/1996 | Juzswik et al. | |
| 5,526,347 A | 6/1996 | Chen et al. | |
| 5,710,699 A | 1/1998 | King et al. | |
| 5,752,047 A | 5/1998 | Darty et al. | |
| 6,072,673 A | 6/2000 | Chen et al. | |
| 6,154,379 A | 11/2000 | Okita | |
| 6,577,138 B2 | 6/2003 | Zuercher et al. | |
| 6,608,396 B2 | 8/2003 | Downer et al. | |
| 6,643,112 B1 | 11/2003 | Carton et al. | |
| 7,315,774 B2 | 1/2008 | Morris | |
| 7,408,319 B2 | 8/2008 | Lloyd et al. | |
| 7,453,680 B2 | 11/2008 | Hallak et al. | |

(Continued)

FOREIGN PATENT DOCUMENTS

| | | |
|---|---|---|
| DE | 19607669 A1 | 9/1997 |
| EP | 1921531 A1 | 5/2008 |
| EP | 2179882 | 4/2010 |

OTHER PUBLICATIONS

Extended European Search Report for EP application No. 12181283.8 mailing date May 10, 2013.

(Continued)

*Primary Examiner* — Daniel Cavallari
(74) *Attorney, Agent, or Firm* — Cantor Colburn LLP

(57) ABSTRACT

An active damping switching system includes an active damping switching apparatus, including a damping capacitor, a damping resistor coupled to the damping capacitor, an input switch coupled to the damping capacitor, an oscillator coupled to the input switch and configured to open and close the input switch at a frequency, a direct current power source coupled to the active damping switching apparatus, a constant power load and an input filter disposed between the constant power load and the active damping switching apparatus.

12 Claims, 4 Drawing Sheets

(56) References Cited

U.S. PATENT DOCUMENTS

| | | |
|---|---|---|
| 7,564,147 B2 | 7/2009 | Michalko |
| 7,595,613 B2 | 9/2009 | Thompson et al. |
| 7,715,958 B2 | 5/2010 | Kumar |
| 7,741,883 B2 | 6/2010 | Fuller et al. |
| 7,830,071 B2 | 11/2010 | Abramovich et al. |
| 7,847,429 B2 | 12/2010 | Miyama et al. |
| 7,932,633 B2 | 4/2011 | King et al. |
| 7,952,225 B2 | 5/2011 | Reichard et al. |
| 8,080,973 B2 | 12/2011 | King et al. |
| 8,295,950 B1 | 10/2012 | Wordsworth et al. |
| 8,536,730 B2 | 9/2013 | Rozman et al. |
| 8,669,743 B2 | 3/2014 | Rozman et al. |
| 2002/0157881 A1 | 10/2002 | Bakholdin et al. |
| 2003/0102845 A1 | 6/2003 | Aker et al. |
| 2004/0156154 A1 | 8/2004 | Lazarovich et al. |
| 2004/0238243 A1 | 12/2004 | King et al. |
| 2006/0103358 A1 | 5/2006 | Schulte et al. |
| 2007/0029986 A1 | 2/2007 | Nakamura et al. |
| 2008/0106152 A1 | 5/2008 | Maier |
| 2008/0143462 A1 | 6/2008 | Belisle et al. |
| 2009/0295341 A1 | 12/2009 | Nakamura et al. |
| 2009/0314179 A1 | 12/2009 | Kumar |
| 2010/0254046 A1 | 10/2010 | Liu et al. |
| 2011/0100735 A1 | 5/2011 | Flett |
| 2012/0112702 A1 | 5/2012 | Steigerwald et al. |
| 2013/0049465 A1 | 2/2013 | Rozman et al. |

OTHER PUBLICATIONS

European Search Report dated May 10, 2013 for Application No. 12181283.8-1503.

European Search Report dated May 10, 2013 for Application No. 12181417.2-1503.

European International Search Report dated Dec. 20, 2012 for Application No. 12181229.1-1233.

ACTIVE DAMPING WITH A SWITCHED CAPACITOR

BACKGROUND OF THE INVENTION

The subject matter disclosed herein relates to electric power generation and distribution, and more particularly to systems and methods for active damping with a switched capacitor.

Electrical power systems in hybrid vehicles, such as military hybrid vehicles, can include high voltage direct current power generation and distribution systems. Such electrical systems, however, can experience stability problems. Constant power loads, such as a switched mode power converter may introduce a destabilizing effect on a DC bus, causing significant voltage oscillation. The source ripple filter must attenuate rectification ripple and current harmonics resulting from active rectifier switching. The input filter of a switching power converter must provide forward voltage attenuation of alternating current (AC) voltage superimposed on a DC bus voltage, attenuate current harmonics resulting from power converter switching and those injected into DC bus to allowed levels, and have a low output impedance so as not to adversely affect the stability of switched-mode power converter. A power converter's input LC filter without a damper introduces possible instability in the presence of constant power (i.e., negative impedance) loads. Traditionally LC or RC damping networks are used to stabilize unstable loads. The LC damper is connected in series with the inductor of the input LC filter, while an RC damper is connected in parallel with the capacitor of the input LC filter. The size of damping networks is considerably larger than the input LC filter itself, and can therefore increase system size and weight.

BRIEF DESCRIPTION OF THE INVENTION

Exemplary embodiments include an active damping switching system, including an active damping switching apparatus, including a damping capacitor, a damping resistor coupled to the damping capacitor, an input switch coupled to the damping capacitor, an oscillator coupled to the input switch and configured to open and close the input switch at a frequency, a direct current power source coupled to the active damping switching apparatus, a constant power load and an input filter disposed between the constant power load and the active damping switching apparatus.

Additional exemplary embodiments include an active damping switching system, including an active damping switching apparatus, including a damping capacitor, a damping resistor coupled to the damping capacitor, an input switch coupled to the damping capacitor, a zero cross detector coupled to the input switch, a direct current power source coupled to the active damping switching apparatus, a constant power load and an input filter disposed between the constant power load and the active damping switching apparatus.

Additional exemplary embodiments include an active damping switching system, including an active damping switching apparatus, including a first input switch, a first damping resistor coupled to the first input switch, a second input switch, a damping capacitor coupled to the second input switch, a second damping resistor coupled to the damping capacitor, a first gate drive coupled to the first input switch and a second gate drive coupled to the second input switch an to the first gate drive, a direct current power source coupled to the active damping switching apparatus, a constant power load and an input filter disposed between the constant power load and the active damping switching apparatus.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
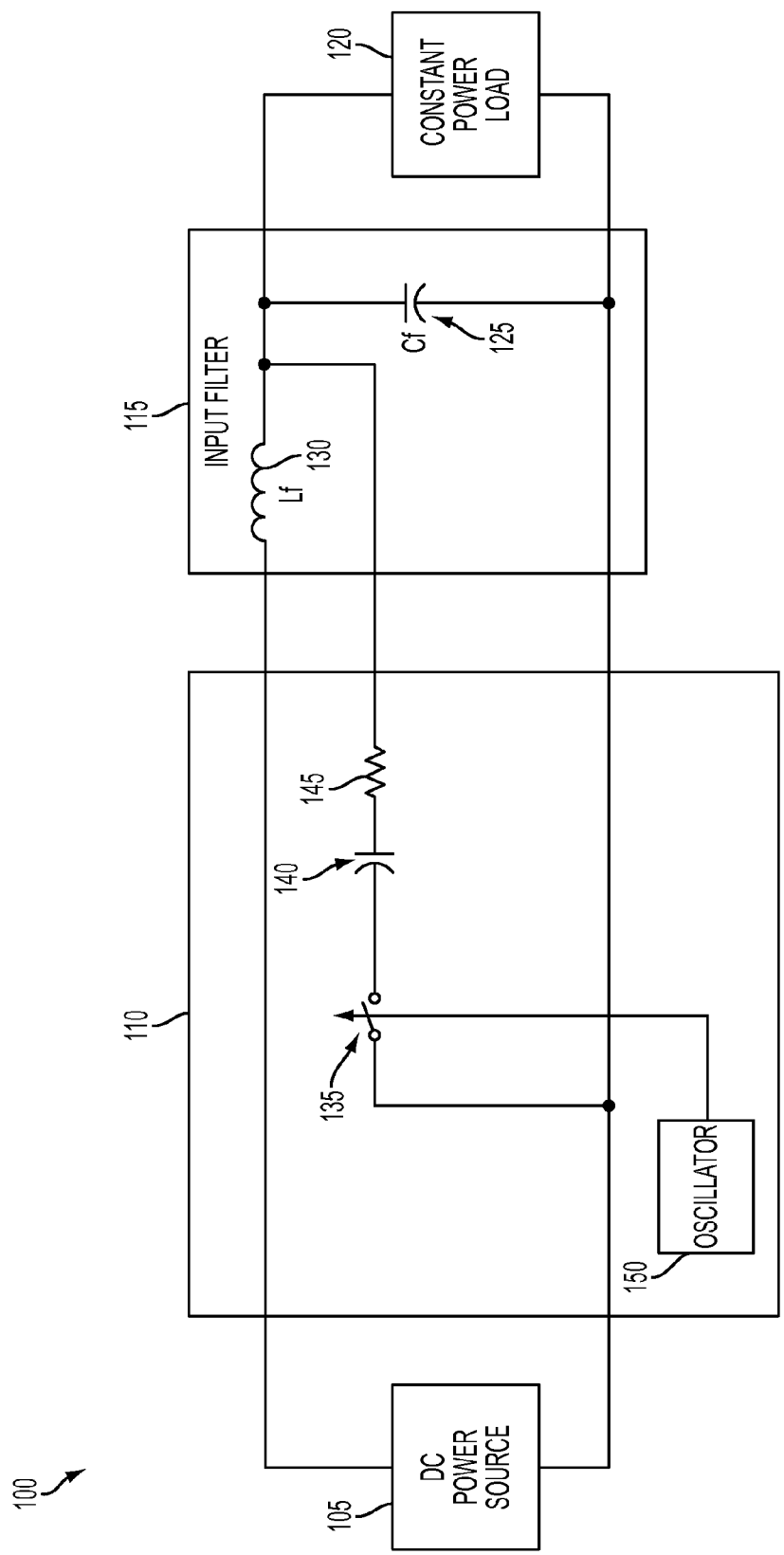
FIG. 1 illustrates a DC electric power system with a switched capacitor stabilization network with an external oscillator.

Exemplary embodiments include systems and methods for active damping by implementing a switched RC stabilization network. In response to current ripple on the DC bus, the RC stabilization network can be switched on to dampen the ripple. FIG. 1 illustrates an active damping system 100. In one embodiment, the system 100 can include a DC power source 105 electrically coupled to a constant power load 120 via input filter 115. In one embodiment, the DC source 105 can be an AC generator rectified to a DC voltage that includes voltage/current ripples. The system 100 can further include a switched capacitor stabilization network 110. In one embodiment, the input filter 115 is an LC filter having an input capacitor 125 and an input inductor 130 having values selected to filter out certain frequencies in voltage/current that exists between the dc power source 105 and the constant power load 120.

In one embodiment, the switched capacitor stabilization network 110 includes an input switch 135 electrically coupled to the damping capacitor 140. The damping capacitor 140 is coupled to a damping resistor 145 that is coupled to a point between the input inductor 130 and the input capacitor 125 of the input filter 115. The switched capacitor stabilization network 110 can further include an oscillator 150 tuned at frequency equal or close to the resonant frequency of the LC input filter 115

$$f = \frac{1}{(2\pi\sqrt{LC})}.$$

In one embodiment, if the system 100 becomes unstable, the switched capacitor stabilization network 110 stabilizes the system 100 by closing switch 135 which places the damping capacitor 140 and the damping resistor 145 in parallel with the input capacitor 125 of the input filter 115 for a period of time, by directly controlling the input switch 135. In one embodiment, the oscillator 150 switches the damping capacitor 140 and the damping resistor 145 into parallel with the input capacitor 125 at a frequency approximately equal to the resonant frequency of the LC input filter 115. By matching the frequency of the oscillator 150 to the resonant frequency of the input filter 115, system oscillations can be eliminated.

Figure 2:
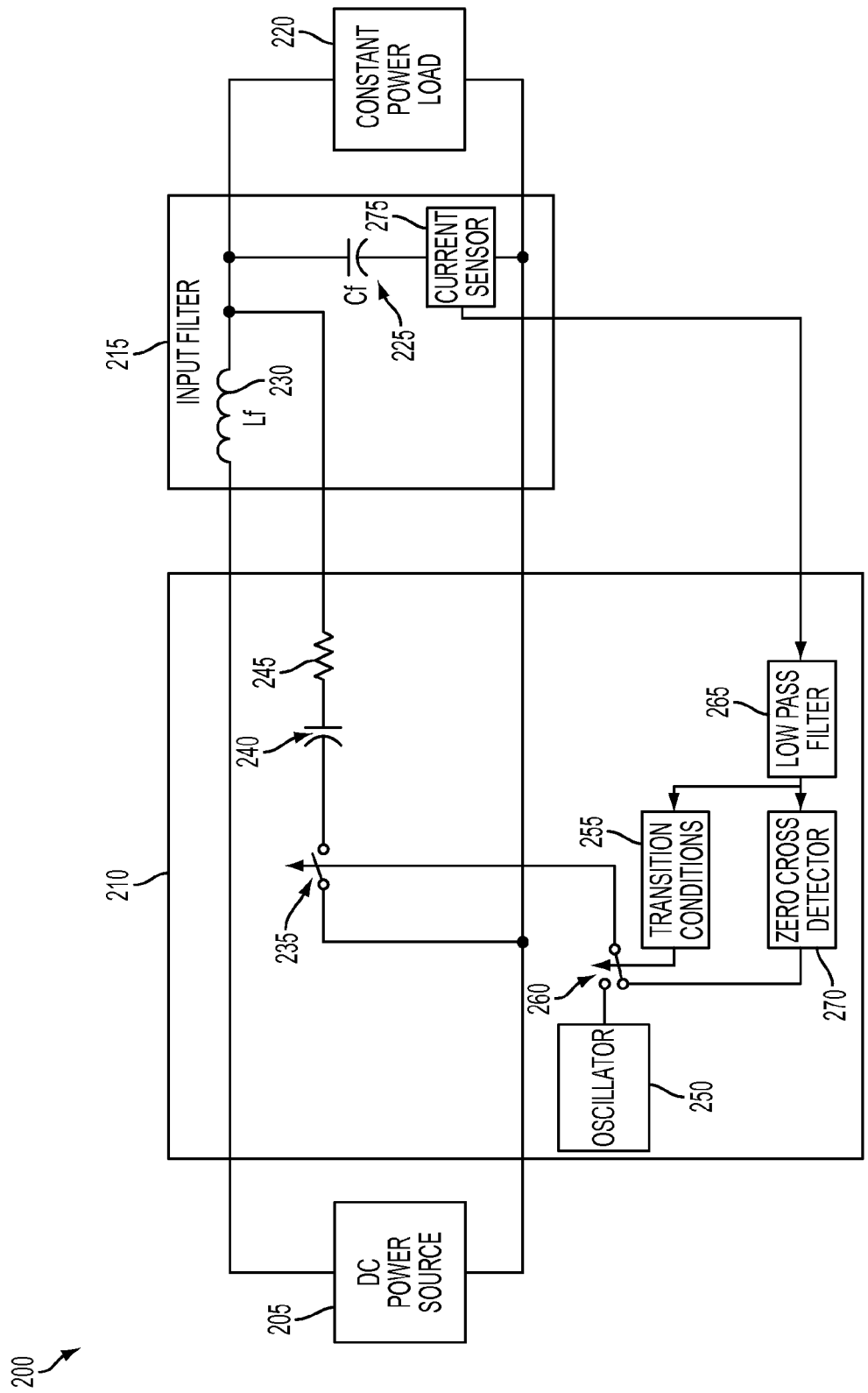
FIG. 2 illustrates DC electric power system with a switched capacitor stabilization network with a combination of external oscillator and filter capacitor feedback current.

FIG. 2 illustrates an active damping system 200. In one embodiment, the system 200 can include a DC power source 205 electrically coupled to a constant power load 220 via input filter 215. The system 200 can further include the switched capacitor stabilization network 210. In one embodiment, the input filter 215 can be an LC filter having an input capacitor 225 and an input inductor 230 tuned to filter out certain frequencies in voltage/current that exists between the dc power source 205 and the constant power load 220. The input filter 215 further includes a current sensor 275 coupled to the input capacitor 225 as further described herein.

In one embodiment, the switched capacitor stabilization network 210 includes an input switch 235 electrically coupled to the return path of DC power source 205. The input switch 235 is coupled to a damping capacitor 240. The damping capacitor 240 is coupled to a damping resistor 245 that is coupled to a point between the input inductor 230 and the input capacitor 225 of the input filter 215. The switched capacitor stabilization network 210 can further include an oscillator 250 tuned at frequency equal or close to the resonant frequency of the LC input filter 215

$$f = \frac{1}{(2\pi\sqrt{LC})}.$$

In one embodiment, if the system 200 becomes unstable, the switched capacitor stabilization network 210 stabilizes the system 200 by closing switch 235 which places the damping capacitor 240 and the damping resistor 245 in parallel with the input capacitor 225 of the input filter 215 for a period of time, by directly controlling the input switch 235. In one embodiment, the oscillator 250 switches the damping capacitor 240 and the damping resistor 245 into parallel with the input capacitor 225 at a frequency approximately equal to the resonant frequency of the LC input filter 215. By matching the frequency of the oscillator 250 to the resonant frequency of the input filter 215, system oscillations can be eliminated.

In one embodiment, the switched capacitor stabilization network 210 can further include filter capacitor feedback current to control the damping in the system 200. As such, the switched capacitor stabilization network 210 can further include a transition conditions controller 255 coupled to the oscillator 250 via a second switch 260. In one embodiment, the transition conditions controller 255 can switch between the damping provided by the oscillator 250 and damping provided by the filter capacitor feedback current. The switched capacitor stabilization network 210 can therefore further includes a low pass filter 265 to select frequency due to system instability. The filter 265 is coupled to a zero cross detector 270. Transition condition block 255 controls switch 260 in response to the magnitude of the current ripple detected by the current sensor 275. During initial detection of unstable system 200 operation, current magnitude is above pre-determined level and switch 260 is connected to the output of zero-cross detector 270 forcing stabilization switch 235 to respond to the frequency detected by the current sensor 275. When current magnitude falls below pre-determined level, the transition condition block 255 reconnects control input of switch 235 to the output of the oscillator 250 via switch 260. This approach benefits system stabilization by providing fast reduction of voltage/current ripple during initial detection of system instability and reduction of voltage/current ripple during steady-state operation. The filter capacitor feedback current from the input capacitor 225 in the input filter 215 is detected by a current sensor 275 coupled between the input capacitor 225 and the filter 265, and disposed in the input filter 215. In one embodiment, the current sensor 275 can detect the filter capacitor feedback current from the input capacitor 225 and pass the current to the filter 265.

The transition conditions controller 255 can be any suitable microcontroller or microprocessor for executing the instructions (e.g., on/off commands) described herein. As such, the suitable microcontroller or microprocessor can be any custom made or commercially available processor, a central processing unit (CPU), an auxiliary processor among several processors, a semiconductor based microprocessor (in the form of a microchip or chip set), a microprocessor, or generally any device for executing software instructions.

Figure 3:
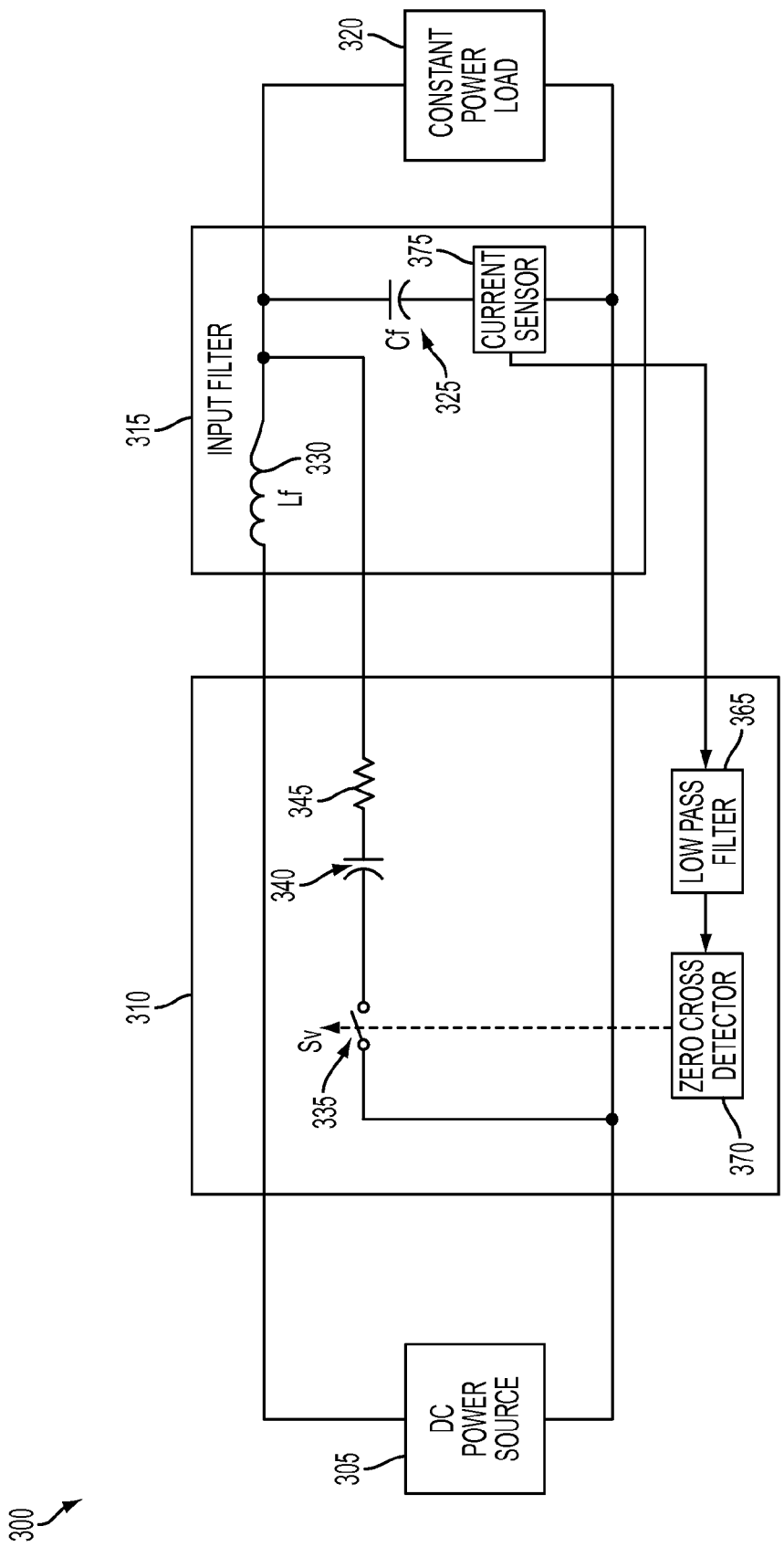
FIG. 3 illustrates a DC electric power system with a switched capacitor stabilization.

In another embodiment, active damping is also attained by synchronizing switch control with the frequency due to system instability. FIG. 3 illustrates an active damping system 300. In one embodiment, the system 300 can include a DC power source 305 electrically coupled to a constant power load 320 via input filter 315. In one embodiment, the DC source 305 can be an AC generator which output is rectified to a DC voltage that includes voltage ripple. The system 300 can further include the switched capacitor stabilization network 310. In one embodiment, the input filter 315 can be an LC filter having an input capacitor 325 and an input inductor 330 having values selected to filter out certain frequencies between the switched capacitor stabilization network 310 and the constant power load 320. In one embodiment, the switched capacitor stabilization network 310 further includes an input switch 335 electrically coupled to a damping capacitor 340, which is further coupled to a damping resistor 345, which is coupled to the input filter 315. The switched capacitor stabilization network 310 can further include filter capacitor feedback current to control the damping in the system 300. The switched capacitor stabilization network 310 can therefore further include a low pass filter 365 to select frequency due to system instability. The filter 365 is coupled to a zero cross detector 370. In one embodiment, the zero cross detector 370 is implemented such that the input switch 335 is turned on/off as the filter capacitor feedback current crosses zero. The input filter 315 further includes a current sensor 375 coupled between the input capacitor 325 and the filter 365. The filter capacitor feedback current from the input capacitor 325 in the input filter 315 is detected by the current sensor 375. In one embodiment, the current sensor 375 can detect the filter capacitor feedback current from the input capacitor 325 and pass the current to the low pass filter 365. When the zero cross detector 370 detects the filter capacitor feedback current crossing zero, the input switch 335 is closed placing the damping capacitor 340 and the damping resistor 345 in parallel with the filter capacitor 325 thereby providing active damping based on the filter capacitor feedback current.

Figure 4:
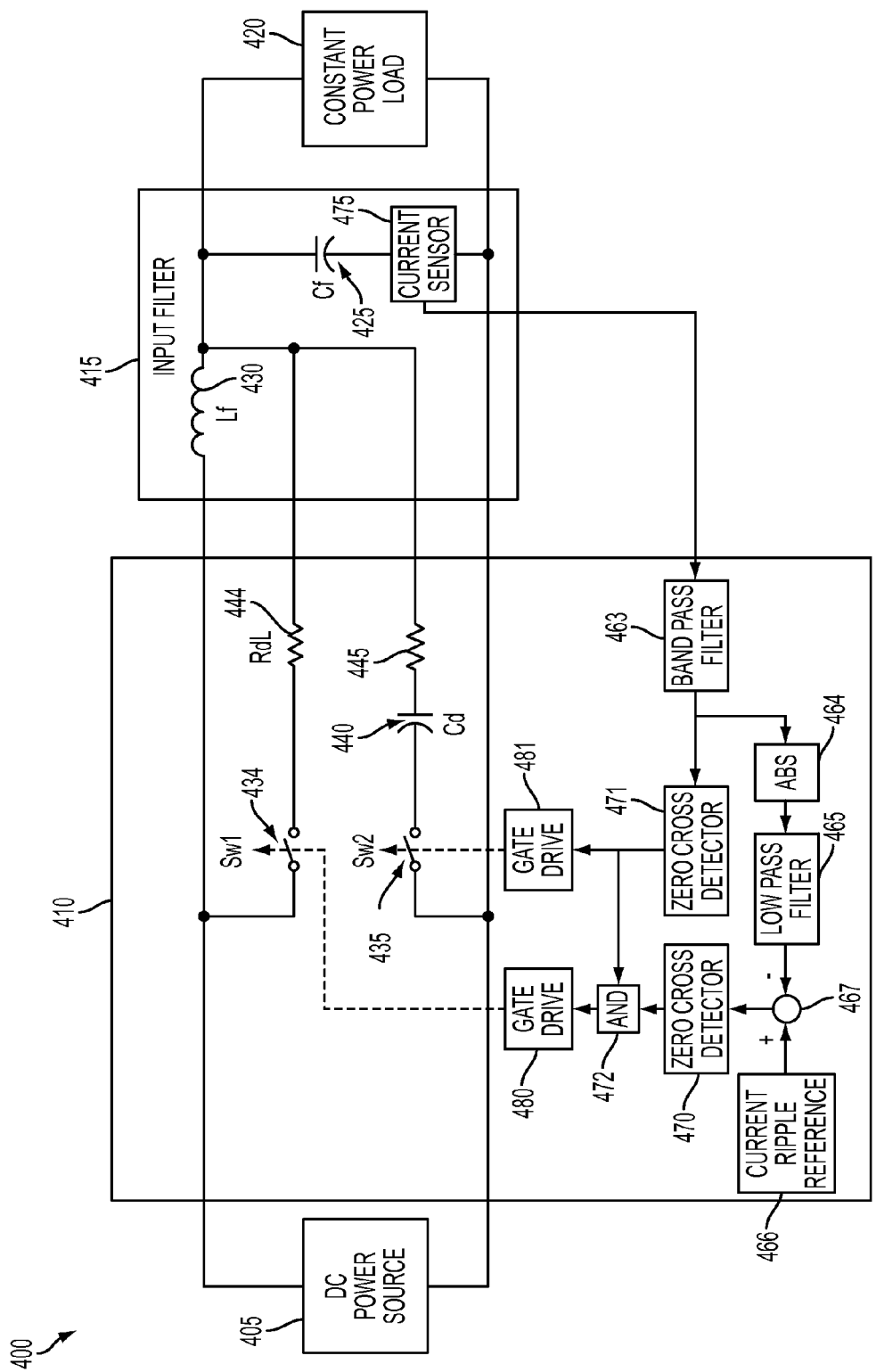
FIG. 4 illustrates DC electric power system with dual control active damping.

In another embodiment active damping can also be attained by synchronizing multiple switches within a switched capacitor stabilization network for dual control. FIG. 4 illustrates an active damping system 400. In one embodiment, the system 400 can include a DC power source 405 electrically coupled to a constant power load 420 via input filter 415. In one embodiment, the DC source 405 can be an AC generator which output is rectified to a DC voltage that includes voltage ripple. The system 400 can further include the switched capacitor stabilization network 410, coupled to a constant power load 420. In one embodiment, the input filter 415 can be an LC filter having an input capacitor 425 and an input inductor 430 having values selected to filter out certain frequencies between the dc power source 405 and the constant power load 420. The input filter 415 further includes a current sensor 475 described further herein.

The system 400 includes a first input switch 434 coupled to the DC power source 405 and a first damping resistor 444. The first damping resistor 444 is further coupled to the input filter 415. The system 400 further includes a second input switch 435 coupled to the damping capacitor 440 and to a second damping resistor 445, which is coupled to the input filter 415. Each of the first and second switches 434, 435 is respectively coupled to a first and second gate drive 480, 481. The first gate drive 480 is coupled to an "and" function 472 and a first zero cross detector 470. The second gate drive 481 is coupled to a second zero cross detector 471. As described further herein, the first gate drive 480 activates the first switch 434 when current inputs to both the first and second zero cross detectors 470, 471 pass zero, and the second gate drive 481 activates the second switch 435 when current input into the second zero cross detector 471 passes zero. Dual control of stabilization network 410 via switch 434 and switch 435 allows size reduction of damping capacitor 440 and minimize power losses in damping resistor 444. The second zero cross detector 471 is also coupled to a band pass filter 463 that is coupled to the current sensor 475 in the input filter 415. The band pass filter 463 is coupled to an absolute value unit 464, which is coupled to a low pass filter 465, which filters our any undesirable high frequencies, such as high frequency harmonics. The band pass filter 463 is tuned to the frequency defined by the input filter 415.

$$f = \frac{1}{(2\pi\sqrt{LC})}.$$

The absolute value unit 464 provides a positive number for later comparison to a current ripple reference 466. The low pass filter 465 and the current ripple reference 466 are coupled to a comparator 467 that is coupled to the first zero cross detector 470. Current is input into the first zero cross detector 470 if the current from the low pass filter 465 exceeds the current ripple reference 466.

On one embodiment, the system 400 attains active damping by closing and synchronizing the input switches 434, 435. Technical effects include the improvement of power quality of the system bus by providing active damping. In addition, the systems and methods described herein reduce system weight, size, and cost by reducing damping capacitor by approximately three times in comparison the capacitor size required using passive techniques.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An active damping switching system, comprising:
   an active damping switching apparatus, including:
      a damping capacitor;
      a damping resistor coupled to the damping capacitor;
      an input switch coupled to the damping capacitor;
      an oscillator coupled to the input switch and configured to open and close the input switch at a frequency;
   a direct current (DC) power source coupled to the active damping switching apparatus;
   a constant power load; and
   an input filter disposed between the constant power load and the active damping switching apparatus.

2. The system as claimed in claim 1 wherein the oscillator generates a frequency that decreases a steady state ripple voltage through the damping capacitor and the damping resistor.

3. The system as claimed in claim 2 wherein the oscillator is switched to generate the frequency during steady state operation.

4. The system as claimed in claim 1 further comprising a second switch coupled to the oscillator.

5. The system as claimed in claim 4 further comprising a transition conditions controller coupled to the second switch.

6. The system as claimed in claim 5 further comprising a zero cross detector.

7. The system as claimed in claim 6 wherein the zero cross detector is configured to switch the second switch on and off responsive to a current input.

8. The system as claimed in claim 7 wherein the zero cross detector couples a current from the input filter to the damping capacitor and the damping resistor.

9. The system as claimed in claim 6 wherein the zero cross detector is configured to pass a current from the input filter in response to transient inputs to the damping capacitor.

10. The system as claimed in claim 6 wherein the input filter is an LC filter that includes an input capacitor coupled to an input inductor.

11. The system as claimed in claim 10 further comprising a current sensor coupled to the input capacitor.

12. The system as claimed in claim 11 further comprising a low pass filter coupled between the current sensor and the zero cross detector.

* * * * *